(12) United States Patent
Barham et al.

(10) Patent No.: US 6,365,116 B1
(45) Date of Patent: Apr. 2, 2002

(54) RHEOLOGY MODIFICATION OF SETTLED SOLIDS IN MINERAL PROCESSING

(75) Inventors: Scott Lewis Barham, Palmyra; Raymond Leslie Henderson, Waikiki, both of (AU)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/552,535

(22) Filed: Apr. 19, 2000

Related U.S. Application Data

(62) Division of application No. 09/233,618, filed on Jan. 19, 1999, now Pat. No. 6,231,768.

(51) Int. Cl.[7] .............................................. B01D 21/06
(52) U.S. Cl. ...................... 423/121; 210/698; 210/699; 210/701; 210/729; 210/730; 210/734; 210/738; 209/5; 423/122
(58) Field of Search ............................... 210/698–701, 210/725, 727, 728, 729, 730, 733, 734, 738, 803, 209, 519, 520, 528; 209/5; 423/121, 122

(56) References Cited

U.S. PATENT DOCUMENTS

| | | | | |
|---|---|---|---|---|
| 860,775 A | * | 7/1907 | Usher | 210/520 |
| 3,036,715 A | * | 5/1962 | Gould | 210/520 |
| 3,314,547 A | * | 4/1967 | Kivell | 210/520 |
| 3,338,827 A | * | 8/1967 | Mausolf | 210/520 |
| 4,055,494 A | * | 10/1977 | Emmett | 210/519 |
| 4,169,824 A | * | 10/1979 | Kane | 423/111 |
| 4,274,958 A | * | 6/1981 | Fitch | 210/208 |
| 4,711,727 A | * | 12/1987 | Matthew et al. | 210/727 |
| 5,478,468 A | * | 12/1995 | Deno et al. | 210/208 |
| 5,653,946 A | * | 8/1997 | Parker et al. | 423/121 |
| 6,231,768 B1 | * | 5/2001 | Barham et al. | 210/698 |

FOREIGN PATENT DOCUMENTS

AU          A-67587/94          7/1994

* cited by examiner

*Primary Examiner*—Peter A. Hruskoci
(74) *Attorney, Agent, or Firm*—Bell, Boyd & Lloyd LLC

(57) ABSTRACT

The present invention comprises a method for reducing the viscosity of the settled mud or underflow of a raked thickener thereby reducing the torque necessary to move the rake blade through the settled mud. The method includes the step of delivering a viscosity modifier to the settled mud and in front of the rake blade by pumping the viscosity modifier down the rake arm to an area in front of the rake blade. The method also includes an improved rake mechanism that includes a means for delivering viscosity modifier to the settled mud and in front of the rake blade. The present invention also includes a method for increasing the rate of consolidation of flocculated solids in a slurry.

9 Claims, 1 Drawing Sheet

RHEOLOGY MODIFICATION OF SETTLED SOLIDS IN MINERAL PROCESSING

RELATED APPLICATION DATA

The present application is a divisional of U.S. patent application Ser. No. 09/233,618 filed on Jan. 19, 1999 which issued as U.S. Pat. No. 6,231,768 on May 15, 2001.

BACKGROUND OF THE INVENTION

1. Field of the Invention

The present invention relates to separate and/or sequential solid-liquid separation stages used in mineral processing and refining. The present invention also relates generally to a slurry rheology modifiers or viscosity modifiers in the compaction zone of settled solids to reduce rake torque and increase underflow in countercurrent decantation vessels (CCD vessels) as well as non-CCD vessels. More specifically, the present invention relates to the use of slurry rheology modifiers to reduce slurry viscosity of the settled solids in CCD and other types of vessels. Further, the present invention relates to the addition of rheology or viscosity modifiers to a slurry to increase the rate of consolidation of the slurry.

2. Description of the Prior Art

Mineral processing and refining generally involves a number of separate and/or sequential solid-liquid separation stages for purposes such as recovering the liquid which contains valuable components, recycling of the liquid, elimination of solids from the liquid to permit additional processing of the liquid, recovery of solids from the liquid to permit additional processing of the solids and disposal of the solid waste.

For example, in the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where alumina is released from the ore as caustic-soluble sodium aluminate. The digested slurry is then cooled to about 230° F., typically employing a series of flash tanks wherein heat and condensate are recovered. The aluminate liquor leaving the flashing operation contains from about 1 to about 20 weight percent suspended solids, which solids consist of the insoluble residue that remains after, or is precipitated during, digestion. The coarser solid particles may be removed from the settler solid, normally a 15–30% solid slurry, is washed with on-coming liquor from the washing cycle, i.e., countercurrent displacement wash circuit or sand filter, whichever is being utilized. The resultant underflow, generally having from 10–40% solids, is subsequently washed a plurality of times. The wash waters containing suspended red mud and dissolved alumina and caustic are then also treated with chemicals to promote settling. The countercurrent washing circuit utilizes two or more washers which receive a mud washer feed slurry from either the settler underflow or other washer underflow, as well as any dilution liquor. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculated. This initial clarification of the pregnant liquor into a clarified liquor phase is referred to as the primary settler stage. Flocculating agents improve the separation of insolubles by increasing the rate at which the solids settle, by reducing the amount of residual solids suspended in the liquor, and by decreasing the amount of liquor in the settled solids phase.

Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other materials, and commonly represent from about 5 to about 50 percent of the dry weight of the bauxite ore. Generally, these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant aluminate liquor will require a more extensive treatment to remove residual solids, and/or the alumina trihydrate recovered will contain levels of impurities that are undesirably high for many end-uses.

The polysaccharides starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process.

U.S. Pat. No. 3,390,959 issued Jul. 2, 1968 to Sibert, uses acrylate homopolymers and copolymers which contain not more than 20% of other ethylenically unsaturated polymerizable polar monomers for the Bayer process. Included in Sibert's polar comonomers are acrylamide and diethylvinylphosphonate, among others. Diethylvinylphosphonate is the diethyl ester of vinylphosphonic acid, and can be hydrolyzed to the monoethyl ester in caustic solution. Complete hydrolysis of diethylvinylphosphonate groups to dibasic vinylphosphonic acid salt groups is not observed in caustic solution under Bayer process conditions, so the polymers of Sibert are neither converted to in use nor are equivalent to the hydroxymethyl diphosphonic acid polymers of the present invention.

U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process.

U.S. Pat. No. 3,445,187, May. 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000, and preferably in excess of 100,000.

U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically-unsaturated monomer and has a molecular weight in excess of 100,000.

U.S. Pat. No. 3,681,012, Aug. 1, 1972, Sibert, uses an acrylic acid polymer most preferably having a molecular weight of at least 1,000,000, either alone or in combination with starch, for clarification of digested bauxite containing solubilized alumina and red mud residues. U.S. Pat. No. 4,767,540, Aug. 30, 1988, Spitzer et al., uses a polymer that contains hydroxamic acid groups for the same purpose. U.S. Pat. No. 5,008,089, Apr. 16, 1991, Moody et al., uses a combination of dextran and synthetic anionic polymer for flocculating red mud in Bayer process liquors.

U.S. Pat. No. 5,217,620, Jun. 8, 1993, Mahoney et al., uses a combination of pullulan, lactan, rhamsan, or zooglan with a conventional water soluble anionic flocculant for red mud settling.

The synthetic flocculating agents employed for the settling or filtration of red mud are generally water soluble polymers of one or more ethylenically-unsaturated monomers, and have been used together, as noted above, with starch and dextran for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquors.

After the final wash step in the Bayer process, the mud is normally concentrated via vacuum filtration or other means to a plastic mass which must be transported and acted upon by chemical processing equipment such as pumps, conveyors, mixers and the like. The concentration of the red mud contained in these solid-like suspensions can range between 40–75%. The handling of such unworkable masses has always been a problem for the aluminum manufacturing industry, equipment designers and equipment manufacturers. If it were possible to readily decrease the viscosity of these materials so they could be acted upon by means of pumps and other fluid handling devices, a great improvement would be made in this art.

A number of other mineral refining and processing techniques involve the use of raked thickeners whereby a solid-liquid slurry is introduced into a vessel, permitted to settle and the thickened slurry disposed on the bottom of the vessel is at least partially removed by way of action of a rake which moves the thickened slurry towards an outlet where the slurry can be removed from the vessel by pumping. In practice, the rake drive and rake structure must be designed so that it can deliver the torque required to direct the thickened slurry towards the outlet. The torque required is a function of a number of variables, two of which are the viscosity and yield point of the thickened slurry or underflow. If the viscosity or yield point of the underflow could be reduced, the rake mechanism which includes the rake drive, rake arm and rake blade could be designed at a lower cost.

Further, if the viscosity and yield point of the underflow could be reduced, a higher slurry concentration could be provided without requiring an upgrade in the rake drive mechanism or structural strength of the rake. If the viscosity and yield point of the underflow could be reduced, the overall cost of raked thickeners could be reduced because the rake mechanism could be provided with a lighter structure, requiring fewer raking arms and/or a smaller drive unit. Still further, the efficiency of raked thickeners could be improved because the installation of larger rake blades would be possible for a more efficient sweeping action.

Unsuccessful attempts to reduce underflow rheology by the duel addition of flocculated and viscosity modifier to the feed of the vessel have previously been made.

SUMMARY OF THE INVENTION

The present invention provides a method of reducing the viscosity of settled mud or underflow of a raked thickener which comprises the steps of introducing a slurry into the vessel, allowing the slurry to settle to form a layer of settled mud or underflow at the bottom of the vessel, pumping a viscosity modifier to a vicinity of the rake blades, and, moving the rake blades through the settled mud and viscosity modifier.

In an embodiment, the rake arm comprises a hollow conduit connected to a reservoir containing the viscosity modifier and at least one opening for releasing the viscosity modifier in the vicinity of the rake blades.

In an embodiment, the rake arm comprises a hollow conduit containing the viscosity modifier. The rake arm further comprises two opposing ends, each with an outlet for releasing the viscosity modifier at the opposing ends or the extremities of the rake arm.

In an embodiment particularly suitable for an outwardly raked thickener, the rake arm comprises a hollow conduit containing the viscosity modifier. The rake arm also comprises an outlet for releasing the viscosity modifier at a central area of the rake arm In an embodiment, the viscosity modifier is selected from the group consisting of lignosulfonate, a polyacrylate, a copolymer of (meth)acrylic acid and acrylamide, (meth) acrylic acid, 2-acrylamide-2-methylpropane sulfonic acid, taurine modified polymers, napthalein sulphonates, napthalein sulphonate derivatives and hydroxymethyl diphosphonic acid polymers.

In an embodiment, the present invention provides an improved rake mechanism for a thickener or counter current decantation vessel. The rake mechanism of the present invention comprises a rake drive connected to a rake shaft. The rake shaft connects the rake drive to a rake arm. The rake arm includes a plurality of downwardly extending rake blades. The mechanism further comprises at least one conduit comprising a first end connected to a reservoir containing a viscosity modifier and a second end for delivering viscosity modifier in the vicinity of the rake blades.

In an embodiment, the mechanism of the present invention further comprises a pump for pumping of the viscosity modifier from the reservoir to the second end of the conduit.

In another embodiment, the present invention provides a method for accelerating the consolidation of flocculated solids in a slurry. Specifically, the method includes the steps of adding viscosity modifiers to a flocculated center well feed of a rake thickener followed by allowing the solids to consolidate at the bottom of the thickener. It has been found that the addition of viscosity modifier to the center well feed increases the rate of consolidation of the flocculated solids.

The invention also comprises a method for fluidifying flocculated aqueous suspensions of red mud in the production of alumina from bauxite in the Bayer process. The method of the invention comprises the steps of using sodium hydroxide to dissolve bauxite to form red mud. The red mud is then decanted and washed and the waters from the washing step are recycled to a location upstream. The red mud is then separated from alumina in successive vats. A flocculant comprising a polyacrylamide having a molecular weight greater than ten million is added into a suspension of red mud in the successive vats simultaneous with the addition of a dispersant. The red mud thus treated is then eliminated from the system as waste.

It is therefore an advantage of the present invention to provide a method for reducing the viscosity of settled mud or thickened slurries disposed at the bottom of raked thickeners and counter current decantation vessels.

Another advantage of the present invention is that it provides an improved rake mechanism design which provides for the delivery of viscosity modifying fluid in the vicinity of the rake blades.

Yet another advantage of the present invention is that it provides a method for reducing the viscosity of red mud in the production of alumina from bauxite.

Another advantage of the present invention is that it provides a method for increasing the speed of consolidation of flocculated solids of a slurry.

Another advantage of the present invention is that it provides a method for reducing rake torque in raked thickeners.

Another advantage of the present invention is that it enables raked thickeners to handle thicker layers of settled mud or thickened slurry disposed at the bottom thereof by increasing the viscosity of the settled mud or thickened slurry.

Other objects and advantages of the invention will become apparent upon reading the following detailed description and appended claims, and upon reference to the accompanying drawings.

BRIEF DESCRIPTION OF THE DRAWING

The invention is illustrated more or less schematically in the accompanying drawing wherein.

Figure 1:
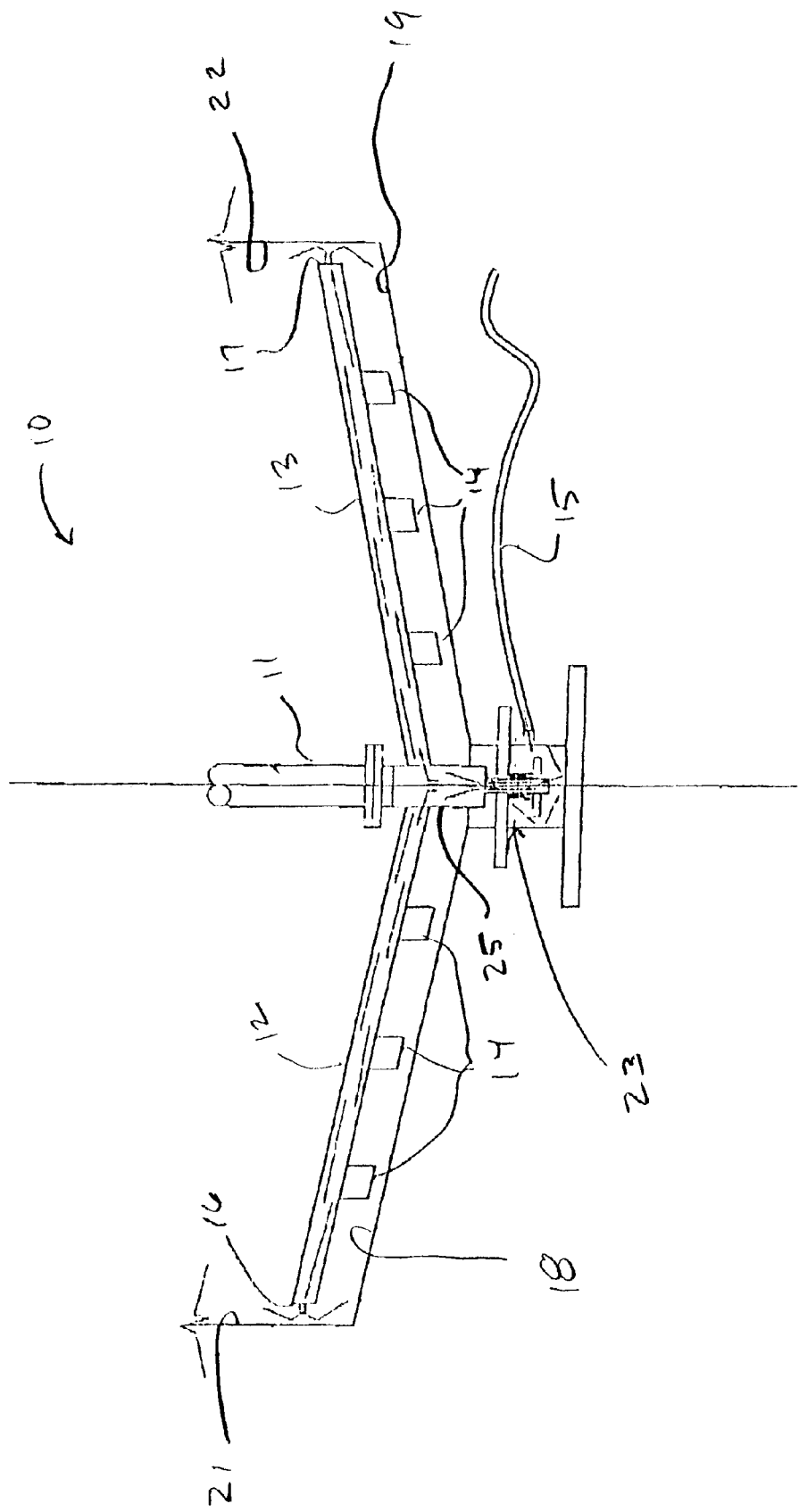
FIG. 1 illustrates, schematically, one embodiment of a rake mechanism equipped with a means for delivering viscosity modifier to the vicinity of the rake blades made in accordance with the present invention.

It should be understood that the drawing is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

The invention comprises a method of lowering the slurry viscosity, i.e. fluidifying, of the underflow from counter current decantation (CCD) vessels by adding slurry rheology modifiers to the mud bed via the rake mechanism.

The present invention applies to mineral processing and mining in general. The present invention further applies to the mining of mineral sands, gold and base metals, nickel, uranium, coal, iron ore, etc.

A flocculant is added to solids bearing liquors as it enters the center of one of several successive vats called thickeners. The liquor moves slowly to an overflow launder around the outer edge of the thickener. The flocculated mud particles collect and settle slowly to the bottom of the thickener. A rake then moves the mud to the outlet at the center of the vessel, where it is removed by pumping.

A major limiting factor in operating a thickener at higher throughputs (tonnage's) is the torque required to drive the raking mechanism. If the mud tonnage is too high, then the rake will bog and the thickener will be left inoperable.

To overcome this limitation, Applicants have developed a method to reduce the rheology of the underflow of the settled mud by the addition of chemical viscosity modifiers. The viscosity modifiers are added to the settled mud via the raking mechanism 10, which, as shown in FIG. 1, comprises a rake shaft 11 connected to rake bladearms 12, 13, which are equipped with a plurality of rake blades shown generally at 14. In the embodiment illustrated, the viscosity modifier (dispersing agent) will be pumped, in a diluted form, through the conduit 15, down the rake arms 12, 13 and out the outlets 16, 17 of the rake arms 12, 13 respectively before being dispersed to the mud in front of or, more preferably for the inwardly raking thickener illustrated in FIG. 1, at the extremities of the rake blades 14. Also, a port (not shown) may be provided at the bottom 25 of the shaft 11. This arrangement would be particularly useful for an outwardly raking thickener (not shown) instead of incorporating ports at the extremities of the arms 12, 13.

The rake arm shaft 11 is connected to a rake drive (not shown). The conduit 15 is connected to a viscosity modifier reservoir (not shown). The rake arms 12, 13 follow the contour of the thickener bottom panels 18, 19 and extend outward toward the thickener walls 21, 22. The rake mechanism 10 further comprises an attachment 23 to the rake arm shaft 11 which permits dosing of the viscosity modifier.

Reducing the rheology (viscosity) of the settled mud in this way will allow a lowering of the rake torque which will, in turn, tolerate an increase in mud density, i.e. throughput.

In addition to lignosulfonate solution, polyacrylates with molecular weights of from about 5,000 to 50,000 daltons can be used as viscosity modifiers according to the invention. Alternatively, copolymers of (meth)acrylic acid and acrylamide, (meth)acrylic acid and 2-acrylamide-2-methylpropane sulfonic acid (AMPS) or taurine modified polymers may be used. The invention broadly allows the use of any viscosity modifier which is capable of reducing the viscosity of thickened red mud.

The main advantage of the invention is that the reduction of underflow rheology will allow a greater slurry density to be tolerated for a given rake load. This will in turn result in improved washing efficiency and/or greater throughput. Increased use of land fill sites by minimizing the amount of liquid being disposed of is also a benefit.

A Weir EnviroTech 1.5 meter diameter pilot thickener was configured to enable the dosage of a lignosulfonate solution at the extremities of the raking mechanism. Although the thickener had instrumentation designed to indicate rake torque variations, the sensitivity was unsuitable for correlation with other trial data. The assessment was, therefore, based on rheological studies of collected underflow samples, and predicted rake torque based on a selection of results.

The results of the trial (summarized in the following table) clearly demonstrated that the technique of the present invention for dosing of viscosity modifier provides the benefits reduces viscosity and yield point.

TORQUE REDUCTION TRIALS - AVERAGED RESULTS

| Run No. | Solids (% w/w) | VM Dosage (mL/min) | Yield Point (Pa) | Viscosity (Pas) | Rake Torque ($10^6$ Nm) |
|---|---|---|---|---|---|
| VM Dosed According to Invention Disclosure | | | | | |
| 1 | 41.1 | 0 | 94.0 | 16.1 | |
| 2 | 43.6 | 0 | 104.0 | 16.5 | |
| 3 | 47.5 | 0 | 156.7 | 22.6 | 1.62 |
| 4 | 48.3 | 4 | 148.3 | 22.1 | |
| 5 | 51.6 | 60 | 123.4 | 17.6 | 1.27 |
| VM Dosed to Thickener Feed Well (i.e. treatment of flocculated feed) | | | | | |
| 6 | 45.1 | 51 | 105.6 | 18.6 | |
| 7 | 51.9 | 51 | 172.0 | 26.6 | 1.77 |

As shown above, a slight reduction in yield point and viscosity is observed at a low viscosity modifier dosage, despite a small increase in slurry solids concentration. See run numbers 3 and 4. Further, a significant reduction in yield point and viscosity was observed at a high viscosity modifier dosage. The yield point and viscosity of 51.1% w/w slurry treated with the viscosity modifier was reduced to a value less than an untreated 47.5% w/w slurry. See run numbers 3 and 5. Still further, significant reduction in the predicted rake torque for a high concentration slurry dosed with the viscosity modifier was observed. Compare the value for the untreated run number 3 (47.5% w/w slurry) with the rake torque for run number 5 (51.6% w/w slurry). It was also noted that while the addition of the viscosity modifier to the flocculated feed in the center well caused a slight reduction in yield point, the yield point reduction was substantially less than that achieved by dosing the viscosity modifier at the rake level. Compare run numbers 6 and 7 with 4 and 5.

However, adding the viscosity modifier to the flocculated feed at the center well increased the rate at which the solids consolidated. Specifically, settling tests in a 500 ml measuring cylinder confirmed the observation showing an improvement in settling rate and settled solid volume as the dosage of the viscosity modifier was increased. The addition of viscosity modifier to the flocculated feed in the center well did not, however, reduce the viscosity to values comparable to those obtained for the technique of applying the viscosity modifier at the extremities of the rake. Compare run numbers 6 and 7 with 4 and 5. Predictive torque modeling software was used to estimate the torque values.

Therefore, by reducing the viscosity of the settled mud, the torque imposed on the rake arm is reduced. Accordingly, rake mechanisms can be designed either more cheaply or existing rake mechanisms can handle thicker layers of settled mud due to the improved viscosity provided by the present invention.

The feed for the above-referenced examples flocculated by dosing a 0–25 v/v 892 latex polymer into a flocculation vessel located at the top of the thickener which discharged into the center well. The settling rates of the solids was controlled to about 7 m/h. The viscosity modifier utilized in the above examples was LIGNOSITE, which was prepared as a 10% powder in lake water. LIGNOSITE is a lignosulfonate solution sold by the Georgia Pacific Corporation of Bellingham, Wash.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method for fluidifying flocculated aqueous suspensions of red mud in the production of alumina from bauxite in a Bayer process wherein a raking mechanism, having a rake arm including a rake blade at one end of the rake arm, is used to remove flocculated red mud, the method comprising the steps of:
    dissolving bauxite using sodium hydroxide to form red mud;
    decanting and washing the red mud, wherein one or more waters derived from the washing step are recycled to a location upstream of the washing step;
    separating the red mud from alumina in successive thickener vats;
    adding a flocculant comprising a polyacrylamide having a molecular weight greater than ten million into a suspension of red mud in one of the successive vats;
    pumping a dispersing agent into the red mud, simultaneously with the
    addition of the flocculant to the suspension in the thickener vat; wherein the dispersing agent is selected from a group consisting of lignosulfonate, a polyacrylate, a copolymer of (meth)acrylic acid and acrylamide, (meth)acrylic acid, 2-acrylamide-2-methylpropane sulfonic acid, taurine modified polymers, napthalein sulfonates, napthalein sulphonated derivatives, and hydroxymethyl diphosphonic acid polymers, and the rake arm comprises a hollow conduit connected to a reservoir containing the dispersing agent, the rake arm further comprises at least one opening for delivering dispersing agent to the vicinity of the rake blade, and
    eliminating the red mud thus treated.

2. The method of claim 1 wherein the dispersing agent is an anionic acrylic acid polymer.

3. The method of claim 1 wherein the hollow conduit comprises a central opening connected to the reservoir containing the dispersing agent and an outlet for delivering the dispersing agent therethrough.

4. The method of claim 1 wherein the hollow conduit comprises two opposing ends, including an outlet for delivering the dispersing agent therethrough and the raking mechanism further comprises a first conduit extending between the reservoir of dispersing agent and the rake arm.

5. The method of claim 1 wherein the dispersing agent is composed of lignosulfonate.

6. The method of claim 1 wherein the raking mechanism includes a rake drive connected to a rake shaft, the rake shaft connecting the rake drive to a rake arm, the rake arm comprising a plurality of rake blades, and at least one conduit comprising a first end connected to the reservoir containing a dispersing agent, a second end disposed in front of the rake blades and an outlet for delivering the dispersing agent therethrough.

7. The method of claim 6 wherein a pump is used for pumping the dispersing agent from the reservoir to the second end of the conduit.

8. The method of claim 1 wherein a first conduit is connected to the rake arm, the first conduit and the rake arm forming a T-connection.

9. The method of claim 1 including the step of pumping the dispersing agent down to the rake arm of the raking mechanism in front of the rake blade.

* * * * *